United States Patent

[11] 3,601,703

[72] Inventor Edward L. Midgley
Carol Stream, Ill.

[21] Appl. No. 839,163
[22] Filed July 7, 1969
[45] Patented Aug. 24, 1971
[73] Assignee Standard Kollsman Industries Inc.
Melrose Park, Ill.

[54] CHANNEL SELECTING DEVICE FOR VOLTAGE RESPONSIVE TV TUNER
1 Claim, 10 Drawing Figs.

[52] U.S. Cl. 325/464, 334/15, 338/137, 178/DIG. 15
[51] Int. Cl. H04b 1/16, H03j 5/02, H01c 5/00
[50] Field of Search 325/459, 461, 464, 465; 178/5.8, 6; 334/15; 338/137

[56] References Cited

UNITED STATES PATENTS

| | | | |
|---|---|---|---|
| 2,745,054 | 5/1956 | Leyenberger | 338/137 |
| 3,505,620 | 4/1970 | Miner | 325/459 |
| 3,522,542 | 8/1970 | La Bude et al. | 325/465 |

*Primary Examiner*—Robert L. Griffin
*Assistant Examiner*—James A. Brodsky
*Attorneys*—E. Manning Giles, J. Patrick Cagney and Peter S. Lucyshyn

ABSTRACT: A television tuner arrangement is disclosed including a wide band signal selecting circuit having a solid state voltage variable capacitance selectively controllable in accordance with the level of applied voltage and a channel selector control for controlling the voltage levels applied thereto. The control illustrated herein includes a selector, actuatable to a plurality of channel selection settings, a cylindrical shaped structure providing an external surface of conductive material, and a plurality of voltage taps radially disposed about the surface of the cylindrical structure and mounted for individual movement along the conductive material. A tuning voltage bus is connected to the wide band circuit and is selectively connectable to each of the taps. The cylindrically shaped structure and taps are mounted for rotation about the axis of the structure and ganged to the selector so that a separate tap is connected to the bus for each channel selection setting.

INVENTOR
Edward L. Midgley

BY J. Patrick Cagney
ATTORNEY

INVENTOR
Edward L. Midgley
BY J. Patrick Cagney
ATTORNEY

INVENTOR
Edward L. Midgley

BY J. Patrick Cagney
ATTORNEY

CHANNEL SELECTING DEVICE FOR VOLTAGE RESPONSIVE TV TUNER

BACKGROUND OF THE INVENTION

In the United States, States, the government has allocated three ranges or bands in the electromagnetic radio spectrum for television broadcast and reception. These are from 54 to 88 megahertz (MHz), from 174 to 216 MHz, and from 470 to 890 MHz. These ranges or bands are further divided into individual channels, each being 6 MHz wide. There are thus five channels in the first band, seven in the second, and 70 in the third band. By convention also, the lowest frequency channel, that is from 54 to 60 MHz, is designated channel 2 while each progressively higher channel frequency is designated by the next highest number Thus, channels 2–6 are in the first band, channels 7–13 in the second band and channels 14–83 in the third band.

The lower two bands (channels 2–13, despite the gap between them, are conventionally referred to as a single band, namely, the Very High Frequency or VHF band. The other band (channels 14–83) is referred to as the Ultra High Frequency or UHF band.

Because of the great disparity between the VHF and UHF frequency ranges, it is the normal practice to employ two separate tuners in a television set designed to receive the VHF and UHF bands. Recently, solid-state tuners have been developed which tune to desired frequencies or channels in response to the application of voltages of various levels. Examples of such tuners are described in Wittig, U.S. Pat. No. 3,354,397, issued Nov. 21, 1967 and entitled "Voltage Variable Diode Capacitance Tunable Circuit for Television Apparatus," and in Manicki, application Ser. No. 839,169, filed July 7, 1969 and entitled "Solid State Tuned UHF Television Tuner."

The above-referred to patent and applications are assigned to the assignee of the present invention, and the disclosures, to the extent not inconsistent herewith, are specifically incorporated herein by this reference.

The requirement imposed by the government that each television set sold in the United States be capable of tuning to all possible channels has presented difficulties with regard to the construction of inexpensive, durable and compact controls for use with the solid-state tuner circuitry. Adding to the difficulties encountered are factors which include the desirability of providing a single tuner control having the capability of selecting both VHF and UHF channels, of providing a control affording preset fine tuning, and providing a control presenting the rotary detent type of channel selection which television viewers are accutomed to.

SUMMARY OF THE INVENTION

A channel selector control comprises, in accordance with the present invention, a selector actuatable to a plurality of channel selection settings to individually select each of a corresponding number of channels, a tuning voltage bus connected to determine the applied voltage at a wide band signal selecting circuit having resonant circuit means including a solid state voltage variable capacitance selectively controllable in accordance with the level of applied voltage, variable voltage facility comprising a single strip of resistive material having two opposite spaced-apart end regions, facility for maintaining a uniform first level of voltage at one of the regions and a uniform second level of voltage at the other of the regions to provide a voltage gradient between the regions, a plurality of voltage taps, one for each channel selection setting, facility for adjustably mounting the taps for individual movement along the strip in the direction of the voltage gradient, and facility responsive to the actuation of the selector for selectively connecting each of the taps individually to the bus whereby a predetermined distinctive level of voltage is applied to the output bus for each channel selection setting.

A more specific aspect of the present invention relates to the construction of the variable voltage facility wherein a separate voltage divider is provided for each channel selection setting, each including a voltage tap, mounting of the voltage dividers in side-by-side extending relation to define an annular array, and provision of structure operating in ganged relation to the selector for rotating the array to a corresponding number of positions for selectively connecting the tuning voltage bus with the particular tap corresponding to the selected channel setting whereby a predetermined distinctive level of voltage is applied to the bus for each channel selection setting.

Another aspect of the present invention relates to the utilization of a cylindrically shaped structure having an external uniform coating of resistive material thereon, and mounting the voltage taps to lead screws which are radially disposed about the exterior of the cylindrically shaped structure, each lead screw being individually rotatable to provide linear movement of a corresponding tap along the resistive material.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same.

DETAILED DESCRIPTION

For purposes of illustrative disclosure the channel selector control of the present invention will be described in the television tuner arrangement of FIG. 1 wherein there is shown a VHF tuner 10 and a UHF tuner 15 which, as indicated previously, are voltage responsive types of solid state circuits. In the VHF tuner 10, the channels are arranged in a low frequency band (channels 2–6) and a high frequency band (channels 7-13). The VHF tuner incorporates a resonant circuit having parallel inductances arranged so that a permanent inductance is operative to determine the low frequency band. A shunt high frequency inductance is switched into operation to act in conjunction with the permanent inductance in determining the high frequency band. In the UHF tuner 15, the channels are arranged in an ultra high frequency band (channels 14–83).

Figure 1:
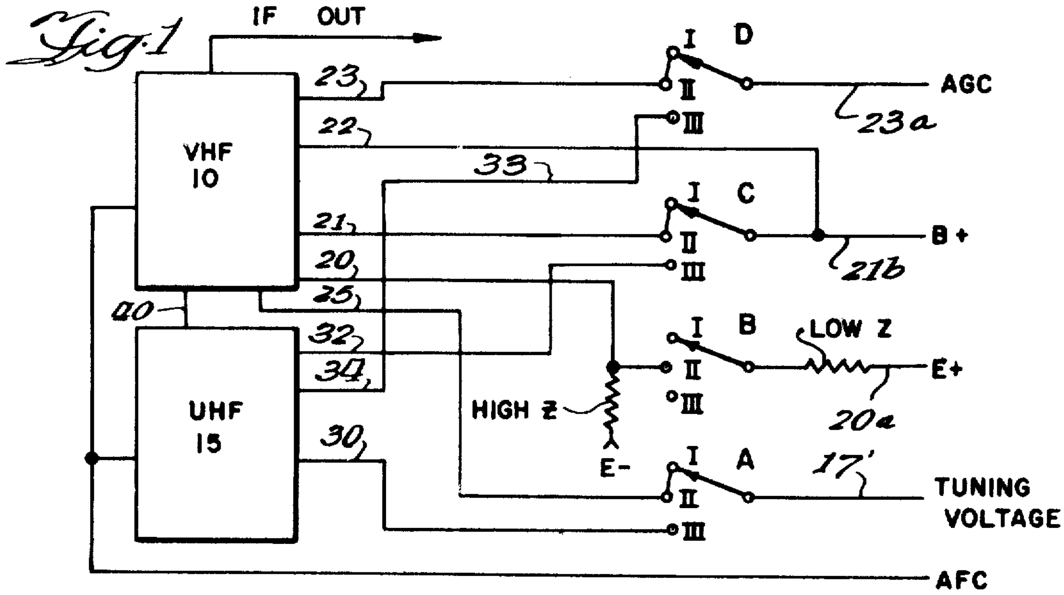
FIG. 1 is a schematic and functional diagram showing the general arrangement of and circuitry for controlling the modes of solid state voltage responsive types of VHF and UHF tuners.

As described in the copending applications referred to above, the tuners 10, 15 have three modes of operation which conveniently can be described with reference to four schematic switches A,B,C and D as follows:

1. A low-band VHF mode which is selected when the switch blades are at position I;

2. A high-band VHF mode which is determined when the switch blades are at position II;

3. A UHF mode which is selected when the switch blades are at position III;

As described in the above referenced applications, tuning the low-band of the VHF tuners is controlled solely by the applied voltage on line 25 in FIG 1, but tuning in the high-band is controlled both by the applied voltage in line 25 and by the switch B, which is operable to direct voltage of either polarity to line 20 to provide for band switching. For high-band operation the switch B is closed to position II, thereby connecting line 20 to the positive voltage bus 20A whereby the shunt inductance of the VHF tuner is in circuit. For low-band operation the switch B is closed to the position I to allow a reverse voltage from bus 20B to feed line 20 and thereby block out the circuit connection to the shunt inductance.

The VHF tuner circuitry in FIG. 1 further includes a conventional AGC supply line 23 which is connectable to an AGC supply bus 23A through switch D. A B+ power supply bus 21B is linked to a mixer B+ line 22 and is connectable by switch C to an OSC and RF B+ line 21.

The UHF tuner 15 includes a conventional AGC supply line 34 which is connectable to the AGC supply bus 23A through line 33 by switch D. The UHF tuner receives power through the B+ power supply line 32 which is connectable to the B+ power supply bus 21B by switch C.

The VHF tuner 10 receives tuning voltage through line 25 which is connectable by switch A to tuning voltage supply bus 17'. Switch A also serves to connect tuning voltage supply bus 17' to the UHF tuner 15 through voltage line 30.

Typically the IF frequency output of the UHF tuner is amplified by using portions of the VHF IF frequency amplification circuitry. Accordingly, line 40 carries the UHF IF frequency signal to the IF amplifier portion of the VHF tuner circuit.

Figure 2:
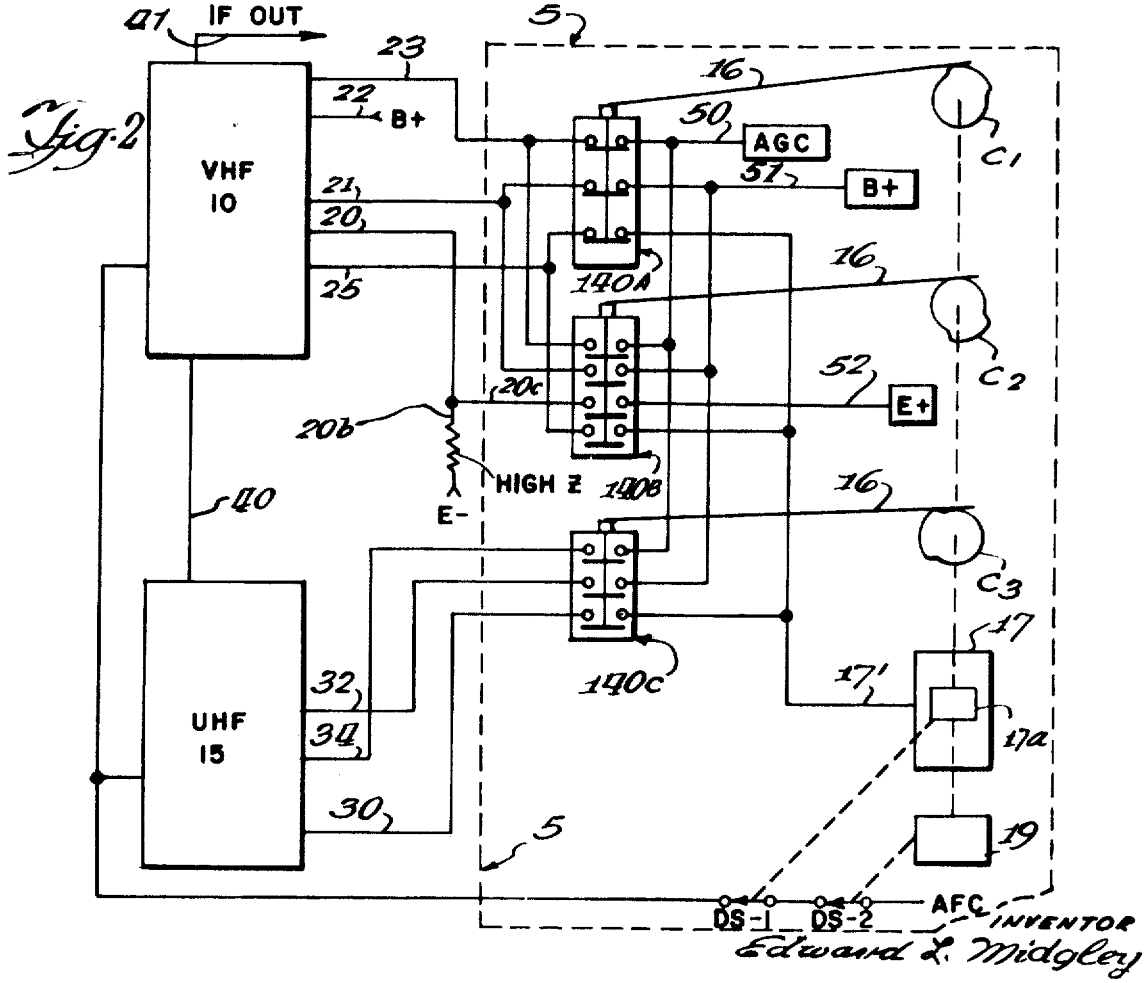
FIG. 2 is a schematic and functional diagram showing a tuner control for controlling the mode and individual channel tuning of solid state VHF and UHF tuners in accordance with the present invention.

Turning to FIG. 2, there is shown diagrammatically a tuner control 5 for controlling the mode of tuners 10, 15 as well as the voltage levels to be applied to the tuners for individual UHF and VHF channel selection.

As illustrated, the tuner control 5 includes a selector mechanism 19 which, as will be explained below, has a plurality of UHF and VHF channel selection settings. Variable voltage means 17 is shown mechanically ganged (as indicated by the dotted line) to the selector 19 and is responsive to the actuation of the selector 19 from channel setting to channel setting to provide selective predetermined tuning voltage levels to voltage bus 17'. Each tuning voltage level so provided corresponds to one of the channels and such voltage level will be produced each time the selector 19 is actuated to such setting.

In the tuner control disclosed herein, each of the voltage levels is independently controllable through actuation of the preset tuning mechanism 17A. As will be explained, the preset tuning mechanism 17A is operable to vary only the voltage level which is being provided to voltage bus 17'. Thus, once the voltage level corresponding to a channel setting has been tuned (when at the selected channel position), it will remain so until the viewer actuates the selector 19 to the same channel setting and again actuates the present tuning mechanism 17A.

For controlling the mode of the tuners 10, 15 the tuner control 5 of FIG. 2 is shown to include three conventional two-position, multipole switches, 140A, 140B, and 140C. As will be apparent, these switches perform the switching functions of schematic switches A,B,C and D of FIG. 1 as described above, Such is accomplished by providing each of the switches with an input AGC line which is connected in parallel with the AGC supply bus 50. Similarly, each of the switches is provided with B+ and tuning voltage input lines which are respectively parallel connected with B+ supply bus 51 and tuning voltage line 17'. In addition, switch 140B has an E+ lead input 52 to provide for band switching in the VHF tuner 10.

As shown, the VHF tuner 10 has its AGC supply line 23 connected in parallel with switches 140A and 140B. Similarly, VHF tuner 10 receives B+ and tuning voltage along lines 21, 25 which are respectively connected in parallel with switches 140A and 140B. As stated above, the polarity of the voltage along VHF band switching voltage line 20 is shown to be controlled by switch 140B. Thus, switch 140A, when closed, determines the low-band VHF mode, while switch 140B, when closed, determines the high-band VHF mode.

The UHF mode is controlled through switch 140C, which, when closed, connects the tuning voltage line 30 to tuning voltage line 17' and which connects AGC and B+ lines 32, 32', 34 and 34' respectively to AGC supply line 50 and B+ supply line 51.

In order to control the opening and closing of the individual switches 140A, 140B and 140C, three corresponding cams C1, C2 and C3 are shown mechanically ganged to the variable voltage source 17 and selector 19. Each of the cams controls the opening and closing of one of the switches by means of a cam follower 16. As shown in FIG. 2 each of the cams has a raised cam lobe portion. When the cam follower of one of the switches 140A, 140B and 140C engages the cam lobe portion of its corresponding cam, such switch will be forced to its closed position. As indicated by the dotted line, the cams C1, C2 and C3 are mechanically ganged to each other and to the variable voltage source 17 and selector 19 so that, when the selector 19 is actuated to a particular channel, only that switch which controls the mode of tuners 10, 15 corresponding to the selected channel will be closed. Thus, for example, FIG. 2 shows the relationship of the switches and cams when one of the low-band VHF channels has been selected.

As will be appreciated by one skilled in the art, the tuners 10, 15 can optionally be provided with conventional AFC to prevent frequency drift in the oscillator stage. Because tuners 10,15 are voltage responsive as stated above, it is important to cutout or defeat the AFC when switching to a channel and when fine tuning a channel. As indicated by the dotted lines an AFC defeat switch DS–2 is ganged to the selector mechanism 19 so that the defeat switch is opened whenever the selector 19 is in a "between channel" position. The defeat switch DS-1 is shown mechanically ganged to the fine tuning mechanism 17A so that the switch is open during the fine turning of the selected channel.

Figures 5, 6, 7, 10:
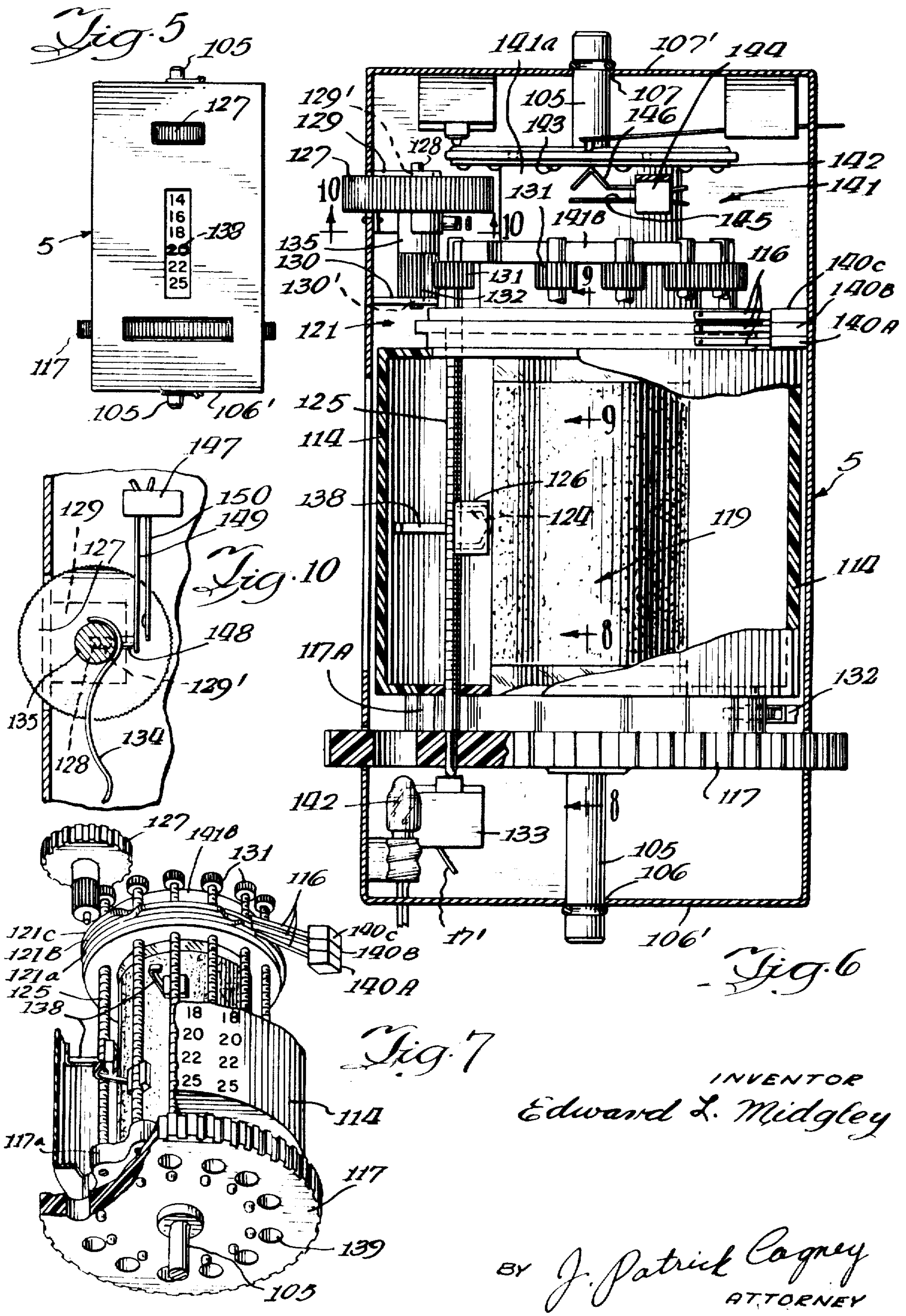
FIG. 5 is a front elevational view a structural embodiment of the tuner control of FIG. 2 and shows the selector thumbwheel, fine tuning dial, and channel readout.
FIG. 6 is a side elevational view of the tuner control of FIG. 3 with the housing will cut away to reveal the interior.
FIG. 7 is a partial perspective view of the tuner control embodiment of FIG. 3.
FIG. 10 is a sectional view taken as indicated on the line 10—10 of Figure 6.

Turning to FIG. 5, the tuner control 5 is shown as it would normally be seen located at the front of a TV receiver cabinet. To select any desired UHF or VHF channel, the viewer need only rotate selector dial or thumbwheel 117. As will be explained in detail below, thumbwheel 117 is provided with a number of equally spaced detented channel selection settings so that the viewer can switch to any desired VHF or UHF channel through rotation of thumbwheel 117 from detent position to detent position. If it is necessary to fine tune the selected channel the viewer need only to press and rotate the fine tuning knob 127, as will be described below.

Figure 8:
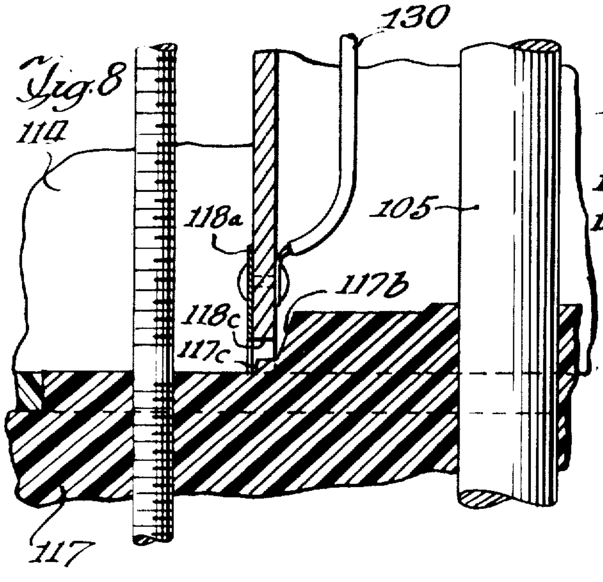
FIG. 8 is a sectional view as indicated on the line 8—8 of Figure 6.

Referring to FIGS. 6 and 7, thumbwheel 117 is shown rigidly supported by shaft 105 which, in turn, is rotatably supported in suitable mounting slots 106, 107 located in opposite tuner control housing end walls 106', 107'. As best shown in FIGS. 7 and 8, thumbwheel 117 includes an annular detented flange portion 117A which, in cooperation with detent roller assembly 132, provides a plurality of detent positions, each of which corresponds to one of the channel selection settings.

Figure 4:
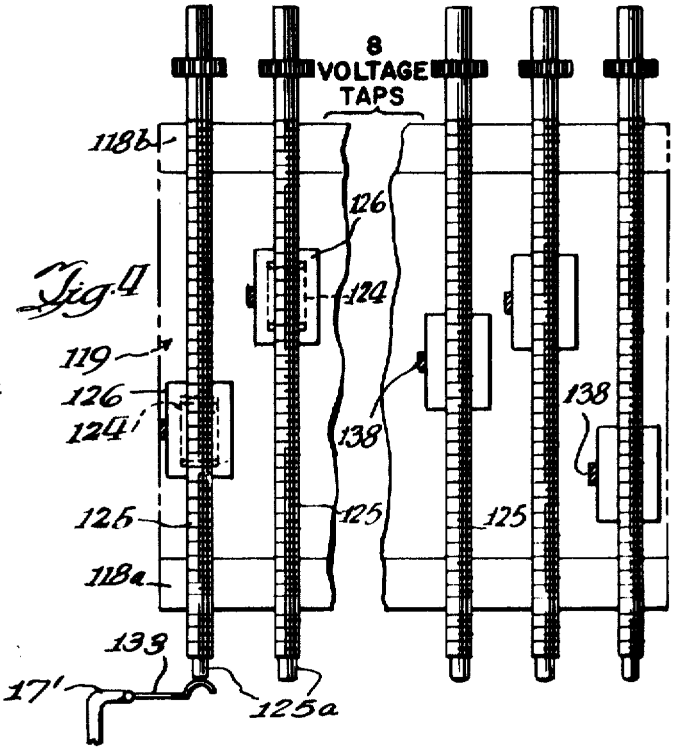
FIG. 4 is a partial fragmentary view showing a development of the resistive drum of FIG. 4 and showing a number of the lead screws and voltage taps.

In the tuner control embodiment disclosed herein, the variable voltage means 17 of FIG. 2 comprises a single strip of resistive material 118 having a pair of uniformly spaced apart opposite edge regions 118A, 118B (FIG. 4). A uniform first level of voltage is maintained along the edge region 118A and a uniform second level of voltage is maintained along edge region 118B. The strip resistive material 118 shown herein is of substantially uniform resistivity and cross section so that a bodily uniform voltage gradient is effected between the edge regions 118A, 118B. That is, the voltage level at points along any single line parallel to the edge regions will be substantially equal. It will be noted that the voltage levels maintained along the edge regions 118A, 118B are such as to define a voltage range sufficient to effect a full range of frequency tuning of tuners 10, 15.

In order to provide tuners 10, 15 with the voltage levels which are necessary to cause the tuners to tune to selective VHF and UHF channels, a plurality of lead screw structures 125, which comprise voltage bus bars, are mounted adjacent the strip 118. Each of the lead screws 125 adjustably mounts a contractor or voltage tap 124 consisting of a formed spring wire mounted in a carrier 126 and simultaneously biased against resistive element 118 and into root of thread on lead screw 125, for movement along the strip 118 in the direction of the voltage gradient. Each of the taps 124 is positioned axially along the strip 118 so as to transmit a predetermined level of voltage to its corresponding lead screw 125. Thus, the end portion 125*a* of each lead screw 125 carries a voltage which corresponds to a required voltage level necessary to cause the tuners 10, 15 to tune to a desired channel frequency. As will be explained in detail below, as the viewer selects a desired channel, the lead screw 125 carrying the voltage level corresponding to the selected channel will be brought into contact with wiper contact 133 and thence to the proper of tuners 10, 15.

Figure 3:
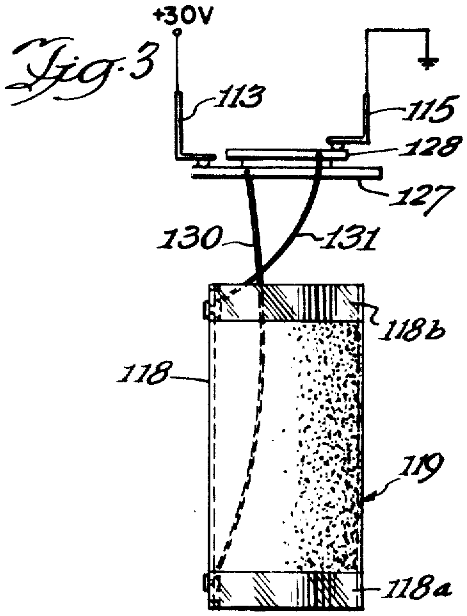
FIG. 3 is a fragmentary elevational view showing the resistive drum and illustrating the manner of providing an axial voltage gradient thereacross.

In FIG. 3 the strip of conductive material 118 is shown as actually comprising a relatively thin outer coating of resistive material which has been applied to the external surface of a cylindrically shaped structure or drum 119. The two external opposite outer end regions 118A', 118B' of the drum 119 are shown to be silvered to provide in conductive contact with the resistive coating. A bodily uniform voltage gradient exists across the resistive material of drum 119 by electrically connecting the silvered region 118A' through line 130 to a source of regulated DC current and by connecting region 118B' through line 131 to ground.

The resistive drum 119 is shown rigidly mounted in axial alignment with thumbwheel 117 for rotation therewith. For this purpose thumbwheel 117 is shown having an annular wedgelike portion 117B over which is seated the end portion 118*a* of drum 119 (FIG. 8). To prevent relative rotational movement between drum 119 and thumbwheel 117, the edge of end portion 118*a* has a carved out segment 118*c* which is fitted about a notch 117*c* of wedge portion 117B. The end portion 125A of the lead screws 125 are reduced in diameter and are shown received and extending through mounting slots provided in thumbwheel 117. The wiper contact 133 is shown mounted adjacent the thumbwheel opposite the drum 199. Thus, as the thumbwheel is caused to rotate from detent to detent, the end portion 125A of each of the lead screws 125 is successively snapped into firm contact with contact 133. As stated, each lead screw 125 acts as a voltage bus bar and, as such, transmits the voltage level of its voltage tap 124 through wiper contact 133 and tuning voltage bus 17' to the proper of tuners 10, 15.

Figure 9:
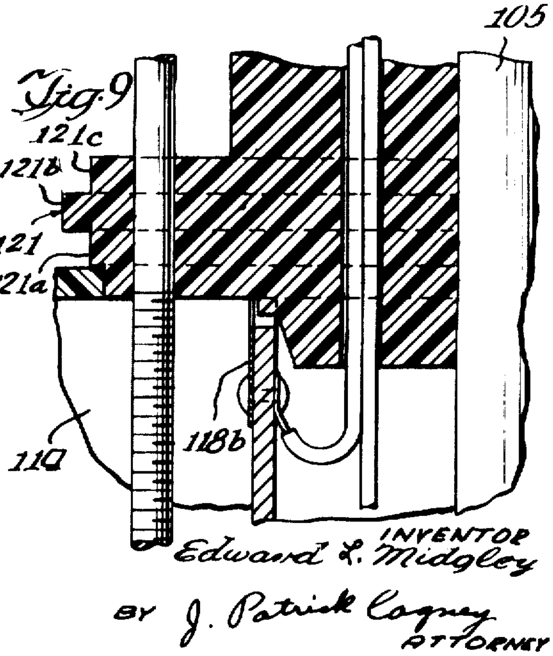
FIG. 9 is a sectional view taken as indicated on the line 9—9 of FIG. 6.

In order to control the mode of tuners 10, 15 as described with reference to the diagrammatic of the tuner control of FIG. 2 a cam structure 121 is shown axially aligned and rigidly mounted to shaft 105. As best shown in FIG. 9 cam structure 121 includes an annular wedgelike portion 121' which supports the end portion 118*b* of drum 119. As shown, each of the lead screws 125 is received and extends through a suitable mounting slot provided in cam structure 121. Thus, rotation of thumbwheel 117 results in corresponding rotation of drum 119, cam structure 121 and lead screws 125.

As best shown in FIGS. 5 and 9, cam structure 121 includes a series of three axially spaced disc portions 121A, 121B and 121C, each having an edge raised cam lobe surface. As will be explained, the three disc portions serve to provide the switch control functions outlined above in the discussion of the cam discs C1, C2 and C3 of FIG. 2.

Three switches 140A, 140B and 140C respectively comprising the 2-position multipole switches as described with reference to FIG. 2 are shown mounted (FIG. 6) in side-by-side arrangement to control housing wall adjacent the cam structure 21. As shown, each of the switches has a cam follower 116 at all times in contact with a corresponding of the cam disc portions 121A, 121B and 121C.

In the typical application disclosed herein, tuner control 5 of FIGS. 3–10 is shown provided with a thumbwheel 117 having 13 detent positions corresponding to an equal number of channel selection settings. Each detent position presents a corresponding lead screw 125 into contact with wiper contact 133, thereby determining the level of voltage of tuning voltage bus 17'. The 13 detent positions are programmed to the tuners 10, 15 by switches 140A, 140B and 140C, as activated by the cam discs of cam structure 121 as follows:

1. Adjacent detent positions 1–3 correspond to three channels in the VHF low-band of channels 2–6. Rotation of thumbwheel 117 to each of these detent positions presents to wiper contact 133 a lead screw 125 having top contact 124 which has been prepositioned along drum 119 so as to provide a voltage level in correspondence to one of the low-band VHF channels. During this time, cam discs 121A, 121B, 121C are caused to rotate to a position so that the raised cam lobe surface of disc 121A is in engagement with the cam follower of switch 140A thereby closing the switch. During this mode the raised cam lobe surfaces of discs 121B and 121C do not engage the cam followers of switches 140B and 140C thereby causing these switches to remain open.
2. Adjacent detent positions 4–7 correspond to 4 channels in the VHF high-band of channels 7–13. These detent positions each presents lead screw into contact with wiper contact 133 providing a voltage level corresponding to one of VHF high-band channels desired. During this mode, the cam disc structure is caused to rotate so that the raised cam lobe surface of cam disc portion 121B engages the cam follower of its corresponding switch 140B while the lobe surfaces of disc portions 121A and 121C assume a disengaged position relative to the cam followers of their corresponding switches 140A and 140C.
3. The remainder of the detent positions, 8–13, corresponds to 6 UHF channels. Each of these detent positions presents to wiper contact 133 a lead screw 125 having a tap arm 124 which has been prepositioned along drum 119 so as to provide a voltage in correspondence to one of the UHF channels. During this mode, cam structure 121 is caused to rotate so as to present the raised cam lobe surface 121C into engagement with the cam follower of switch 140C while lobe surfaces 121A and 121B assume a disengaged relationship relative to the cam followers of switches 140A and 140B.

This arrangement would permit the consumer to program his television set to all local channels as presently assigned in the United States. If the consumer moves from one locale to another, he need only to reposition the voltage taps 124 along drum 119 to provide a set of voltage levels in accordance with the channel frequencies of the new locale.

It should be noted that a relatively small variation in voltage in the UHF mode effects a relatively large range of frequency response in tuner 15, especially at the lower frequency UHF levels (see FIG. 15). For this reason, as well as for convenience of the viewer, it is highly desirable to provide preset fine tuning capability.

In the tuner control embodiment of FIGS. 3–10, preset fine tuning is achieved by providing means for rotating the lead screw structure that is at the selected channel setting (i.e. the lead screw which is in contact with contactor 133), thereby causing the carrier 126 and voltage tap 124 to move axially along drum 119. As stated, an axial voltage gradient exists across drum 119 so that axial movement of the voltage tap 124 produces a variation in the level of voltage transmitted to the corresponding lead screw 125.

To provide for rotation of the lead screws 125, each has a gear 131 (FIGS. 6 and 10) which is individually driven when at the selected channel setting by urging the fine tuning dial 127 inwardly of the tuner control housing, thereby forcing pinion 132, which is rigidly mounted to the drive shaft 128 of knob 127, into engagement with gear 131. Normally pinion 132 is maintained in disengaged relationship with the gears 131 by leaf spring 134 which is shown having one end fixed to the control housing wall and another end in journaled engagement with bearing surface 135 of shaft 128. To allow for inward movement of the fine tuning knob 127, the two opposite end portions of shaft 128 are received in elongated slots 129', 130' provided in the supporting panels 129, 130.

Axial movement of the lead screw structures 125 is effectively prevented by providing a lead screw end thrust support 141, which is secured adjacent cam structure 121 for rotation therewith. The end thrust support 141 includes a disc-shaped portion 141A which seats the end region 125B of each of the lead screws 125 adjacent gears 131. The support 141 additionally has a hollow cup-shaped extension 141B providing a surface mounting for the disc-shaped wiper plates (FIG. 4).

In order to provide for AFC defeat capabilities an annular ring 142 is secured to the cup-shaped extension 141B which provides an annular array of equally spaced nodes 143. An AFC defeat switch 144 is rigidly mounted adjacent the nodes 143 of ring 142. As described with reference to the schematic switch DS—2 of FIG. 2 above, switch 144 functions to deactivate the AFC whenever the viewer is in the process of switching from channel to channel. As shown, switch 144 has a pair of arms 145, 146. Arm 146 is resilient and has a cammed end portion so that as the annular ring is caused to rotate during channel selection, the nodes 143 sequentially engage the cammed portion of arm 146 thereby forcing arm 146 into engagement with arm 145 to ground out the AFC. The spacing of the nodes is such that whenever the control is at a selected channel position the cammed portion of resilient arm 146 will be between adjacent nodes 143 thereby allowing arms 146, 145 to be separated whereby the AFC is activated.

Referring to FIG. 10, a similar fine tuning AFC defeat switch 147 (corresponding to defeat switch DS–1 of FIG. 2) is shown mounted adjacent the fine tuning knob 127 so that whenever knob 127 is in a depressed condition, a projection 148 of the biasing spring 134 will cause resilient arm 149 of switch 147 to contact arm 150 thereby grounding out the AFC.

To facilitate channel selection by the viewer, a readout drum 114 of transparent material is shown rigidly mounted between thumbwheel 117 and cam disc portion 121 (FIGS. 6 and 7). A series of channel indication numerals are printed onto the transparent readout drum 114 directly above each lead screw structure 125. As shown in FIG. 3, the printed numbers are visible to the viewer at each channel setting through an opening 143 provided in the tuner control housing wall. A pointer 138 is shown mounted to each of the carriers 126 to indicate to the viewer the channel at which the voltage tap arm 124 is set. To illuminate the readout drum 114, a series of holes 139 are provided in thumbwheel 117 so as to permit the entry of light from a source of light.

Thus, while preferred constructional features of the invention are embodied in the structure illustrated herein, it is to be understood that changes and variations may be made by those skilled in the art without departing from the spirit and scope of the appended claims.

The embodiments of the invention in which an exclusive property or privilege is claimed are defined as follows:

1. A voltage selector for a voltage controlled TV tuner comprising a voltage divider circuit including a drum rotatable about a central axis, a plurality of voltage taps mounted in an annular array encircling and contacting the periphery of the drum to ride with the drum, means for rotatably indexing the drum for selectively connecting each of said taps individually to the tuner and means for adjusting the point of contact of each tap axially relative to the drum, there being one of said adjusting means corresponding to each tap, each said adjusting means being operable only when its corresponding tap is electrically connected to the tuner, said drum having a cylindrical external surface coating of resistive material bordered by conductive cylindrical strips at opposite axial extremities, said circuit including means applying voltages of different levels to said strips to provide an axial voltage gradient across said coating that is uniform about the circumference of said coating.